US008798909B2

(12) United States Patent
Ashby

(10) Patent No.: US 8,798,909 B2

(45) Date of Patent: Aug. 5, 2014

(54) ENHANCED GEOLOCATION DEVICE

(75) Inventor: David Orion Ashby, Waterloo (CA)

(73) Assignee: BlackBerry Limited, Waterloo (CA)

( * ) Notice: Subject to any disclaimer, the term of this patent is extended or adjusted under 35 U.S.C. 154(b) by 636 days.

(21) Appl. No.: 13/087,533

(22) Filed: Apr. 15, 2011

(65) Prior Publication Data

US 2012/0265432 A1 Oct. 18, 2012

(51) Int. Cl.
*G01C 21/00* (2006.01)

(52) U.S. Cl.
USPC .......... 701/400; 701/409; 701/410

(58) Field of Classification Search
USPC ......... 705/26.1, 21, 6, 39; 386/297, 240, 248; 701/533, 200; 715/700, 800
See application file for complete search history.

(56) References Cited

U.S. PATENT DOCUMENTS

| | | | | |
|---|---|---|---|---|
| 8,195,203 | B1 | 6/2012 | Tseng | |
| 2002/0171673 | A1* | 11/2002 | Brown et al. | 345/700 |
| 2011/0137548 | A1* | 6/2011 | Shen et al. | 701/201 |
| 2011/0211813 | A1* | 9/2011 | Marks | 386/297 |
| 2011/0238514 | A1* | 9/2011 | Ramalingam et al. | 705/21 |

FOREIGN PATENT DOCUMENTS

| | | | |
|---|---|---|---|
| EP | 2025370 | A1 | 2/2009 |
| WO | 2008065639 | A2 | 6/2008 |

OTHER PUBLICATIONS

Maker R: "Garmin Forerunner 310XT In Depth Review", www.dcrainmaker.com Internet Article, Sep. 16, 2009, XP55004150, Retrieved from the Internet: URL:http://www.dcrainmaker.com/2009/09/garmin-forerunner-310xt-in-depth-review.html [retrieved on Aug. 4, 2011].

Maker R: "Garmin Forerunner 610 In Depth Review", www.dcrainmaker.com Internet Article, Apr. 12, 2011, XP55004153, Retrieved from the Internet: URL:http://www.dcrainmaker.com/2011/04/garmin-forerunner-610-in-depth-review.html, Author: Ray Maker.

Wikipedia: "Nike+iPod", Internet Article, Mar. 25, 2011, XP55004196, Retrieved from the Internet: URL:http://en.wikipedia.org/w/index.php?title=Nike%2BiPod&oldid=420671395.

Schmidt B: "Nike+ GPS App for Runners", 1-15 Internet Article, Jan. 30, 2011, pp. 2-2, XP55004341, Retrieved from the Internet: www.benshmidt.com/2011/01/nike-iphone-app.html, Author: Ben Schmidt.

Apple: "iPhone User Guide (for iOS 3.1 Software)", Internet Article, Sep. 9, 2009, pp. 114-122, XP55004252, Retrieved from the Internet: publisher: Apple.

European Patent Application No. 11162572.9 Search Report dated Sep. 22, 2011.

www.intellimec.com.

http://www.apple.com/ipod/nike/.

http://www.blacktrackapp.com/.

http://www.pocketberry.com/2009/07/16/prompt-gps-calendar-for-blackberry/.

(Continued)

*Primary Examiner* — Behrang Badii

(74) *Attorney, Agent, or Firm* — Perry + Currier Inc.; Kristjan Spence

(57) ABSTRACT

The present specification provides an electronic geolocation device comprising a location sensor and a geolocation application configured to record location data associated with said device. The device further includes a processor configured to receive the location data and to associate the location data with contextual data, and to export the location data and contextual data in a data format native to an external application.

12 Claims, 11 Drawing Sheets

(56) References Cited

OTHER PUBLICATIONS http://www.clickapps.com/moreinfo.htm?pid=926&section=uiq&cur=INR http://www.noeman.org/gsm/pocket-pc-smartphone-zone/32972-driving log-v2-1-2-a.html.
http://mobile.engadget.com/2011/04/06/google-intros-maps-5-3-for-android-displays-your-life-in-pie-ch/#.
http://mobiputing.com/2010/04/calltrack-for-android-adds-your-call-log-to-a-google-calendar/.
http://blog.ovi.com/dailyapp/global/2010/03/endomondo-sports-tracker-can-motivate-your-workout-routine-2/.
http://www.apple.com/webapps/travel/mytravellog.html.
http://www.androidzoom.com/android_applications/travel/travel-log_bcrt.
R Maker: "Behind the scenes of Team HTC-Columbia and the Tour de France Live Tracker", www.dcrainmaker.comInternet Article, Jul. 15, 2010, pp. 1-7, XP55015316, Retrieved from the Internet: URL:http://www.dcrainmaker.com/2010/07/behindscenes-of-team-htc-columbia-and.html [retrieved on Dec. 21, 2011].
Sandra Vogel: "My Tracks for Android Review", www.fittechnica.com Internet Article, Jan. 22, 2011, pp. 1-9, XP55015318, Retrieved from the Internet: URL:http://www.fittechnica.com/2011/01/my-tracks-for-android-review.html [retrieved on Dec. 21, 2011].
R Maker: First Look At Wahoo Fitness Ant+ iPhone AdapterU, www.dcrainmaker.comInternet Article, May 6, 2010, pp. 1-11, XP55015317, Retrieved from the Internet: URL:http://www.dcrainmaker.com/2010/05/fi rst-look-at-wahoo-fitnessant-iphone.html [retrieved on Dec. 21, 2011].
Wikipedia: "GPS eXchange Format", Internet Article, Mar. 9, 2011, XP55015405, Retrieved from the Internet: URL: http://en.wikipedia.org/w/index.php?title=GPS_eXchange_Format&0Idid=417897876 [retrieved on Dec. 22, 2011].
European Patent Application No. 11 162 572.9 Examiner's Report dated Dec. 29, 2011.

* cited by examiner

136a

| | | For the Week Of June 14, 2009 | | | | | | |
|---|---|---|---|---|---|---|---|---|
| Event Type | Sunday | Monday | Tuesday | Wednesday | Thursday | Friday | Saturday | Week Total |
| Meetings (Private) | 0 | 0.00 | 0 | 0 | 0 | 0 | 0 | 0.00 |
| Meetings (Public) | | 90.00 | 300.00 | 150.00 | 30.00 | 30.00 | | 600.00 |
| Car Trips (Private) | 134.00 | 44.00 | 26.00 | 31.00 | | 63.00 | | 298.00 |
| Car Trips (Public) | | | 166.00 | | | | | 166.00 |
| Plane Trips | | | | | | 302.00 | | 302.00 |
| Bus Ride | | | | | | | 132.00 | 132.00 |
| Office Phone Calls (Private) | | 6.00 | | 3.00 | 8.00 | | | 17.00 |
| Office Phone Calls (Public) | | | | | 25.00 | | | 25.00 |
| BlackBerry Calls (Private) | 5.00 | | 5.00 | | | | | 10.00 |
| BlackBerry Calls (Public) | | | | | | | | 0.00 |
| Bike Rides | | | | | | | | 0.00 |
| Walking | 34.00 | | 34.00 | | 34.00 | | | 102.00 |
| Running | | | | | | 25.00 | | 25.00 |
| Train Rides | | | | | | 70.00 | | 70.00 |
| Day Total | 173.00 | 140.00 | 531.00 | 184.00 | 97.00 | 490.00 | 132.00 | 1747.00 |
| | | | | | | | | |
| Driving Time | 134.00 | 44.00 | 192.00 | 31.00 | 0.00 | 63.00 | 195.00 | 659.00 |
| Office Phone Minutes | 0.00 | 6.00 | 0.00 | 3.00 | 33.00 | 0.00 | 0.00 | 42.00 |
| BlackBerry Minutes | 5.00 | 0.00 | 5.00 | 0.00 | 0.00 | 0.00 | 0.00 | 10.00 |
| Carbon Footprint (CO2) | 26.8 | 8.8 | 38.4 | 6.2 | 0 | 110.2 | 25.8 | 216.20 |

FIG. 8

ENHANCED GEOLOCATION DEVICE

FIELD

The present specification relates generally to computing devices and more specifically relates to an enhanced geolocation device.

BACKGROUND

Portable computing devices are increasingly powerful and can offer location services through global positioning system (GPS) and other technologies. However, an overwhelming amount of location data can be generated.

BRIEF DESCRIPTION OF THE DRAWINGS

FIG. 8 shows an example view from another application that can be generated as result of performing the method of FIG. 3.

DETAILED DESCRIPTION OF THE EMBODIMENTS

Figure 1:
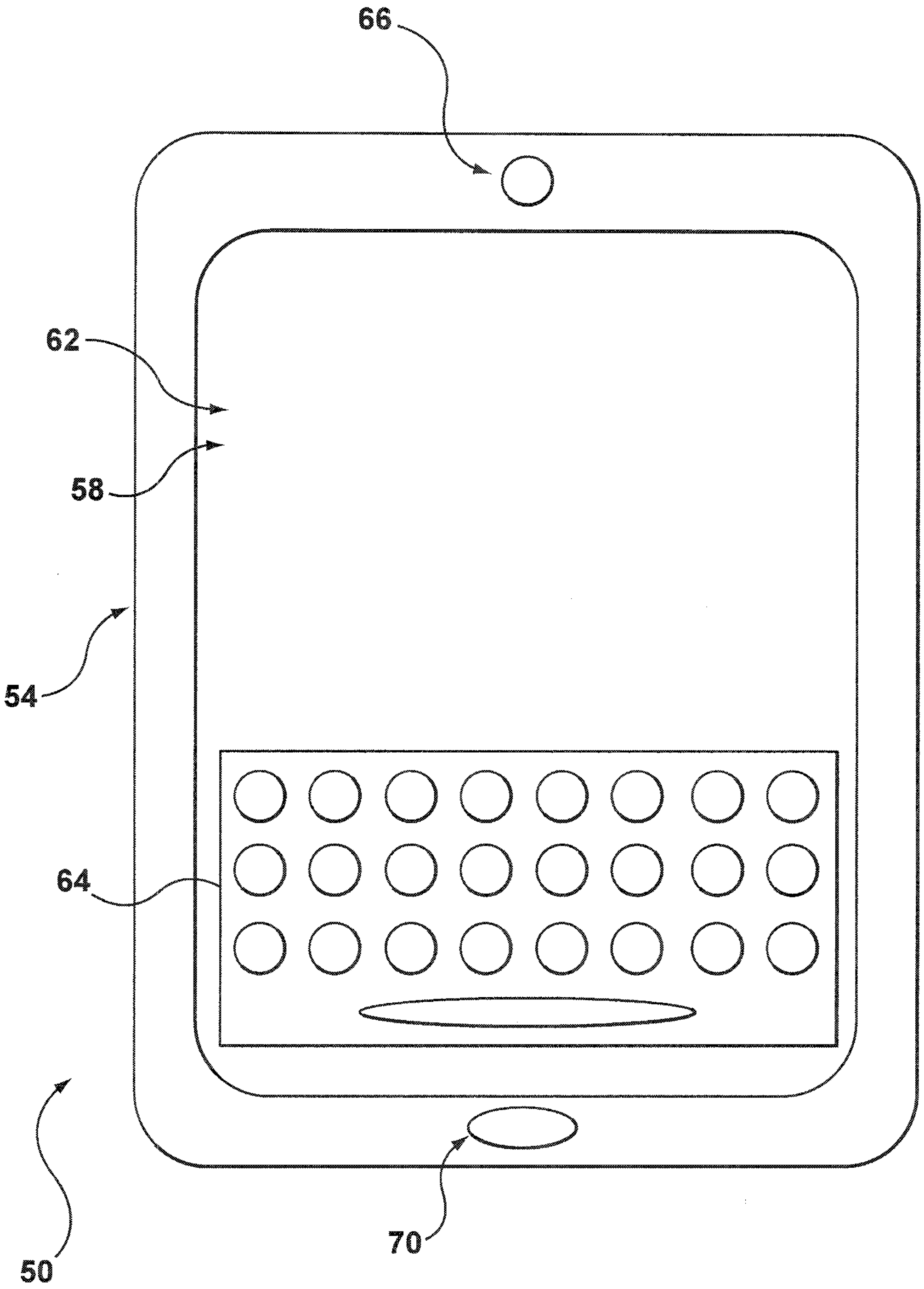
FIG. 1 is a schematic representation of a front view of an exemplary portable electronic device.

An aspect of this specification provides an electronic geolocation device comprising: a location sensor; a processor connected to said location sensor; said processor further configured to execute a geolocation application to periodically record sampled location data received from said sensor; said processor further configured to execute a service separate from said geolocation application configured to associate contextual data with said location data; and, said processor further configured to export said contextual data and said location data from said service into a format native to an external application.

The external application can be a calendar application. The contextual data can comprise at least one of travel activity type, a starting location, a current location and an ending location; a starting time corresponding to said starting location and an ending time corresponding to said ending location and a route map from said starting location to said ending location; a "Completed Trip" data set or a "in Progress Trip" data set. A "Completed Trip" data set can contain at least one travel activity type, a starting location and an end location. An "In Progress Trip" contain at least one activity type, a starting location, a current location and a projected/estimated end location.

The travel activity type can be represented with an appointment colour coding native to said calendar application.

The travel activity type can be represented with a text value in a subject field that is native to said calendar application.

The at least one of said starting location, said current location, and said ending location can be represented with text in a location field native to said calendar application.

The starting time can be represented in a starting time field native to said calendar application and said ending time is represented in an ending time field native to said calendar application.

The route map can be represented as at least one of text or graphics in a notes field native to said calendar application.

The external application can be a travel log spreadsheet.

The service can be configured to access an external mapping service to determine a route map corresponding to said location data as part of said contextual data.

Another aspect of this specification provides a geolocation method for an electronic device comprising: executing a geolocation application on a processor configured to receive location data from a location sensor connected to said processor; receiving at said processor via said geolocation application periodically sampled location data from said location sensor; associating contextual data with said location data at a service separate from said geolocation application; and, exporting said contextual data and said location data a format native to an external application from said service that is separate from said geolocation application.

Another aspect of this specification provides a computer readable medium executable on an electronic device comprising a plurality of programming instructions according to any of the foregoing.

FIG. 1 is a schematic representation of a non-limiting example of a portable electronic device 50 which can be used for enhanced geolocation, as discussed in greater detail below. It is to be understood that portable electronic device 50 is an example, and it will be apparent to those skilled in the art that a variety of different portable electronic device structures are contemplated. Indeed variations on portable electronic device 50 can include, without limitation, a cellular telephone, a portable email paging device, a camera, a portable music player, a portable video player, a personal digital assistant, a portable book reader, a portable video game player, a tablet computer, a netbook computer, or a laptop computer. Other contemplated variations include devices which are not necessarily portable, such as desktop computers.

Referring to FIG. 1, device 50 comprises a chassis 54 that supports a display 58. Display 58 can comprise one or more light emitters such as an array of light emitting diodes (LED), liquid crystals, plasma cells, or organic light emitting diodes (OLED). Other types of light emitters are contemplated. A touch-sensitive membrane 62 is overlaid on display 58 to thereby provide an input device for device 50. As a non-limiting example, device 50 can be configured to selectively show or hide a virtual keyboard 64. Other types of input devices can be provided on chassis 54, other than touch membrane 62, or in addition to touch membrane 62. For example, a physical keyboard, or touch-pad, or joystick or trackball or track-wheel, a microphone, or optical camera or any one or more of them can be provided, in addition to or in lieu of touch membrane 62. Such other components may, if desired, be "slide-out" components. In a present implementation, device 50 also comprises a speaker 66 for generating audio output.

Speaker 66 may be implemented as, or augmented with, a wired or wireless headset or both.

Figure 2:
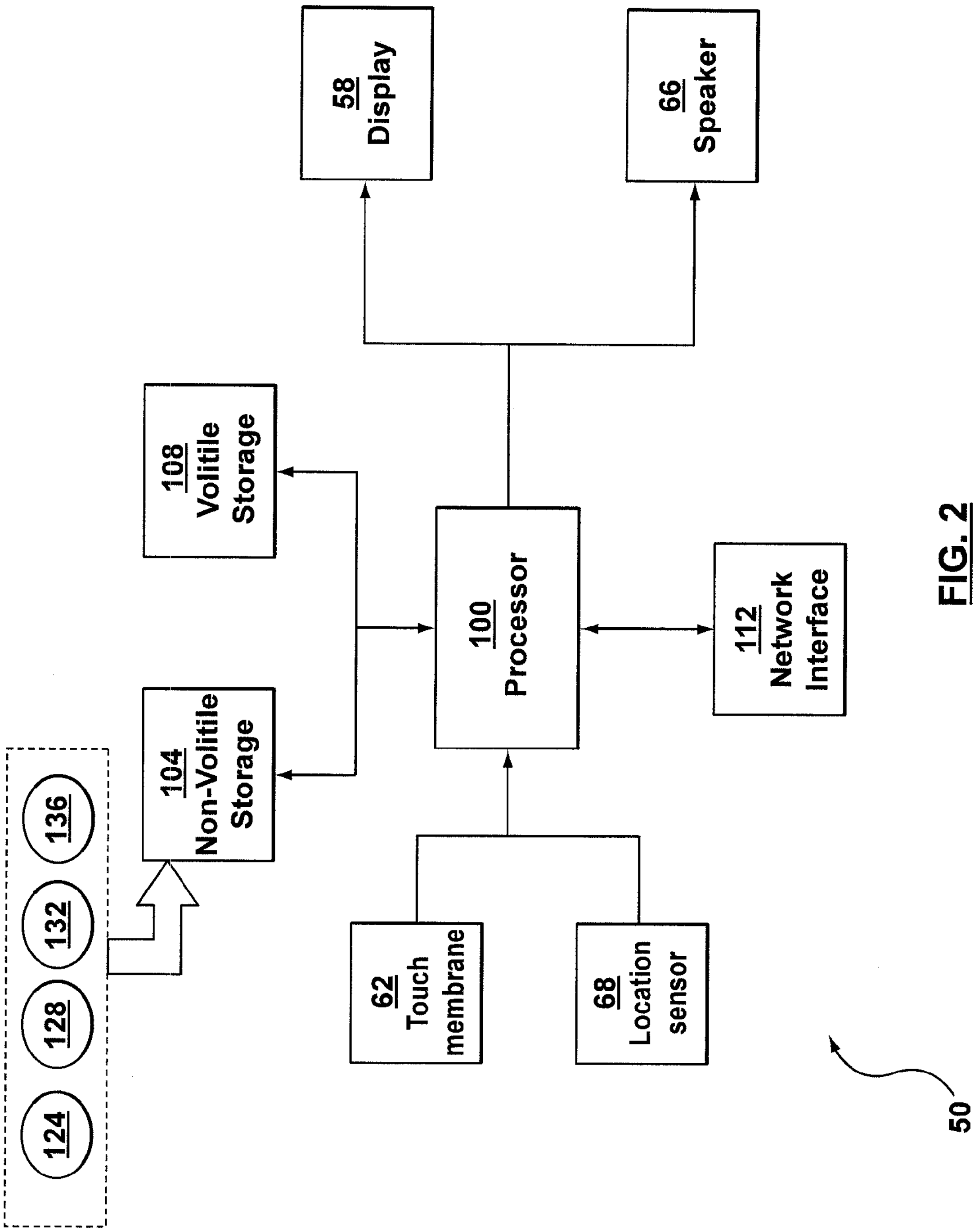
FIG. 2 is a block diagram of the electronic components of the device shown in FIG. 1.

FIG. 2 shows a schematic block diagram of the electronic components of device 50. It should be emphasized that the structure in FIG. 2 is a non-limiting example. In FIG. 2, device 50 includes input devices touch membrane 62 and a location sensor 68. (As noted above, other input devices are contemplated even if not expressly discussed herein.) Touch membrane 62 has been discussed above. Location sensor 68 can be based on a GPS receiver which receives signals from GPS satellites and resolves those signals into location coordinates. Location sensor 68 can also be based on base station triangulation methods, or base station identifiers or both. Other types of location sensors that are functionally similar or equivalent to those expressly discussed herein are contemplated. Multiple location sensors can also be provided.

Input from location sensor 60 and touch membrane 62 is received at a processor 100. In variations, processor 100 may be implemented as a plurality of processors or multi-core processors or both. Processor 100 can be configured to execute different programming instructions that can be responsive to the input received via the one or more input devices. To fulfill its programming functions, processor 100 is also configured to communicate with at least one non-volatile storage unit 104 (e.g. Erasable Electronic Programmable Read Only Memory ("EEPROM"), Flash Memory) and at least one volatile storage unit 108 (e.g. random access memory ("RAM")). Programming instructions that implement the functional teachings of device 50 as described herein are typically maintained, persistently, in non-volatile storage unit 104 and used by processor 100 which makes appropriate utilization of volatile storage 108 during the execution of such programming instructions.

Processor 100 in turn is also configured to control display 58 and speaker 66 and any other output devices that may be provided in device 50, also in accordance with different programming instructions and responsive to different input receive from the input devices.

Processor 100 also connects to a network interface 112, which can be implemented in a present embodiment as a radio configured to communicate over a wireless link, although in variants device 50 can also include a network interface for communicating over a wired link. Network interface 112 can thus be generalized as a further input/output device that can be utilized by processor 100 to fulfill various programming instructions. It will be understood that interface 112 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers ("IEEE") standard 802.11, Bluetooth™ or any of their variants or successors. It is also contemplated each network interface 112 can include multiple radios to accommodate the different protocols that may be used to simultaneously or individually communicate over different types of links. Where location sensor 68 utilizes base station identifiers or base station triangulation, then such network architectures can be accommodated within such a location sensor 68.

As will become apparent further below, device 50 can be implemented with different configurations than described, omitting certain input devices or including extra input devices, and likewise omitting certain output devices or including extra input devices.

Device 50 is configured to maintain, within non-volatile storage 104, a geolocation application 124, a service 128, a calendar application 132 and optionally, one or more additional applications 136. Geolocation application 124, service 128 and calendar application 132 and the one or more additional applications 136 can be pre-stored in non-volatile storage 104 upon manufacture of device 50, or downloaded via network interface 112 and saved on non-volatile storage 104 at any time subsequent to manufacture of device 50.

Processor 100 is configured to execute geolocation application 124, accessing non-volatile storage 104 and volatile storage 108 as needed. As will be explained further below, geolocation application 124 can be used for, amongst other things, recording location data of locations visited by device 50 as detected by location sensor 68. In certain implementations, geolocation application 124 is also configured to associate contextual data with the recorded data and to store recorded geolocation data in an external application such as calendar application 132.

Figure 3:
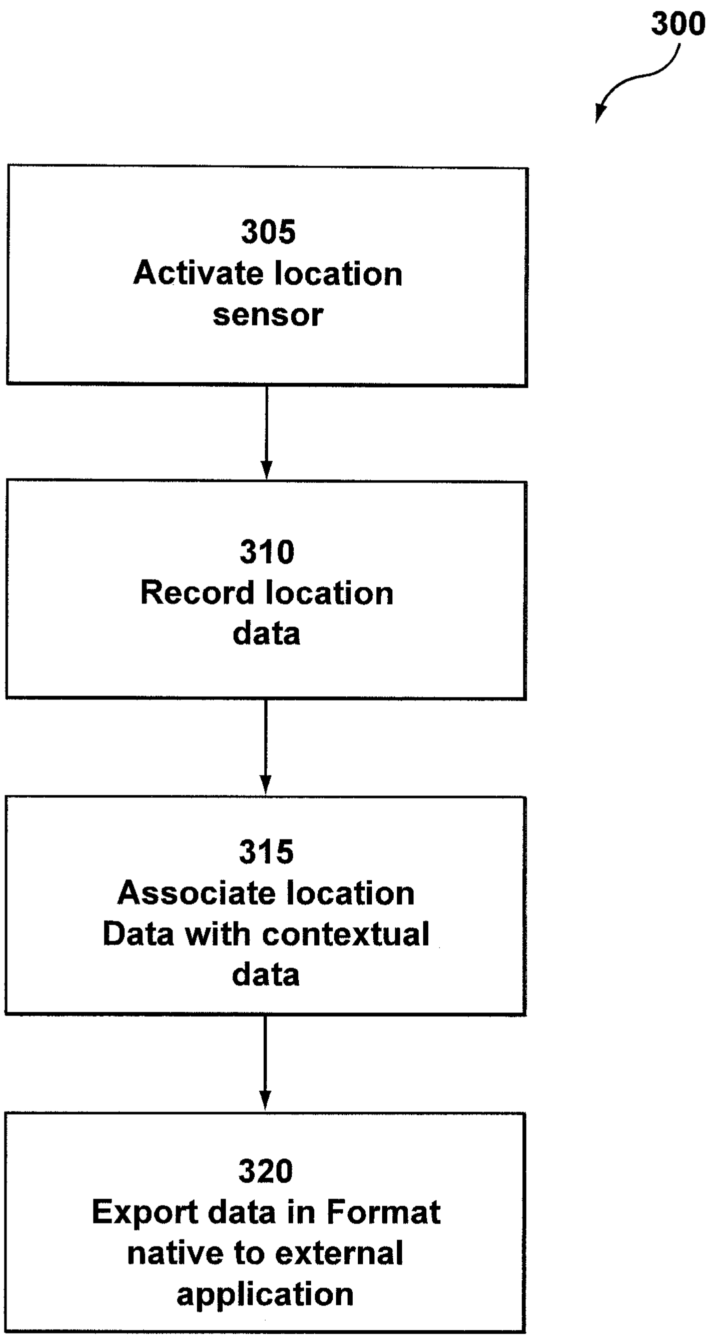
FIG. 3 is a flow chart depicting a method for social media communications.

Referring now to FIG. 3, a flowchart depicting a method for geolocation is indicated generally at 300. Method 300 is one way in which geolocation application 124 can be implemented. It is to be emphasized, however, that method 300 need not be performed in the exact sequence as shown, hence the elements of method 300 are referred to herein as "blocks" rather than "steps". Method 300 can be implemented on a variety of different devices, including device 50. Accordingly, to help explain method 300 it will be explained in relation to device 50.

Block 305 comprises activating a location sensor. When implemented on device 50, block 305 can be effected by geolocation application 124 sending an instruction to sensor 68 via processor 100 to begin receiving location information from location sensor 68. Again, such location information can be in any suitable form, such as coordinates, base station identifiers. For purposes of further illustrative discussion, it will be assumed that location sensor 68 is a GPS receiver and therefore location information is in the form of GPS coordinates, but those skilled in the art are to appreciate that discussion of GPS coordinates is a non-limiting example.

Block 310 comprises recording sensed location information. When implemented on device 50, block 310 can be effected by geolocation application 124 receiving location coordinates from sensor 68 and recording those coordinates in non-volatile storage 104 or volatile storage 108 or both. The frequency with which location coordinates are sampled is not particularly limited, but in general is intended to strike a balance between substantially accurate continuous recording of location while being sensitive to the memory and other resource constraints of device 50. Indeed, in a theoretical device 50 with an infinite amount of storage and processing power, then the sampling frequency could be virtually continuous.

Block 315 comprises associating the location data with contextual data. The contextual data can be meta-data that relates to a plurality of location data points, or can be specific to each location data point. The contextual data can be stored in non-volatile storage 104 or volatile storage 108 or both in association with the coordinates recorded at block 310. Such contextual data comprises at least time stamps that correspond to the location samples recorded at block 310. Note that the term "time" in time stamps is intended to encompass both a calendar date and a time of day for that date, and can also be based on Coordinated Universal Time (UTC).

Figure 4:
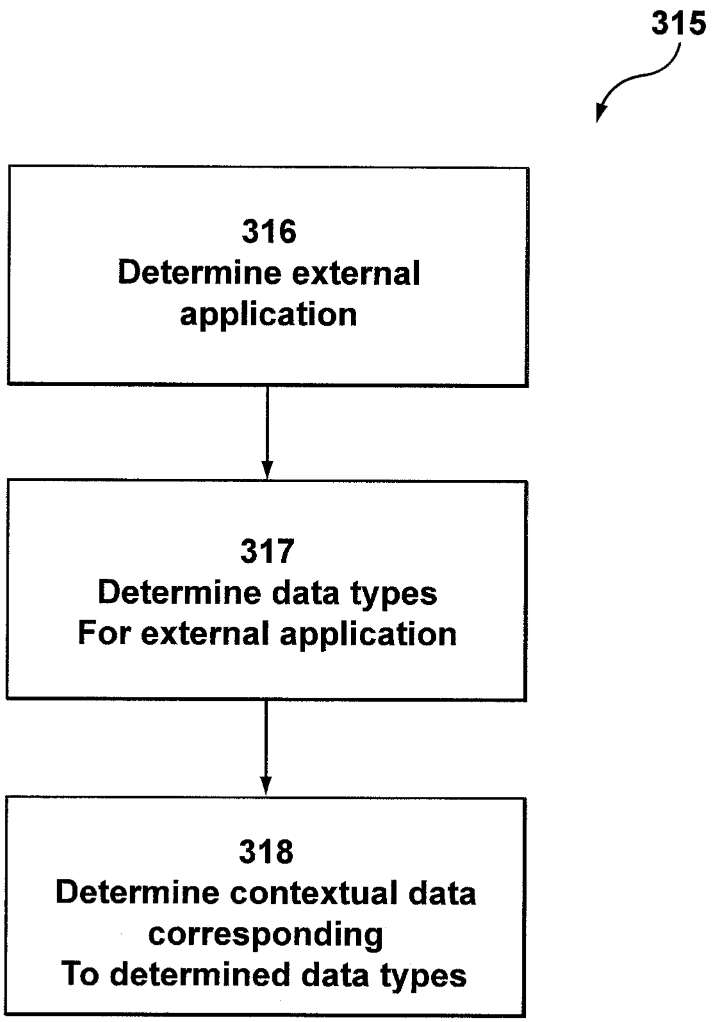
FIG. 4 is a flow chart depicting possible blocks for performing one of the blocks of the method of FIG. 3.

Contextual data can also comprise any other data that can be associated with the location data. The determination of what other data is of interest is not particularly limited, however, in certain implementations, the contextual data can be based on a particular external application. Indeed, FIG. 4 shows a non-limiting example of how block 315 can be implemented. Specifically, block 316 contemplates determining an external application, block 317 comprises determining data types for that external application, and block 318 comprises determining contextual data for those data types determined at block 317. A non-limiting example, discussed further below, of an external application includes calendar application 132.

Referring again to FIG. 3, block 320 comprises exporting data from block 315 in a format that is native to an external application. When block 315 is implemented according to block 316, block 317 and block 318 in FIG. 4, then the external application of block 320 can correspond to the external application determined at block 316.

Having described method 300 generally, various specific but non-limiting example implementations of method 300 will now be discussed. In a first example, device 50 and method 300 are used in conjunction with calendar application 132 to provide rich travel logging functionality. Table I shows a non-limiting example of how existing fields in calendar application 132 can be populated at block 320 using method 300 as a rich travel log.

TABLE I

Travel Log for External Calendar Application
Example Field Mappings

| Field | External Application Field | Field Usage | Examples |
|---|---|---|---|
| 1 | Colour Coding | Non-textual descriptor for travel activity type | Walking = Yellow; Running = Turquoise; Bike trip = Grey; Motor vehicle Trip = Green; Phone call = Purple Train Trip = Yellow; Airplane Trip = Red; Unknown = Mauve |
| 2 | Subject | Textual descriptor for travel activity type | Walking; Running; Biking; Phone call; Motor vehicle Trip; Train Trip; Airplane Trip; Unknown |
| 3 | Location | One or both of starting point and ending point for travel | Specific GPS Coordinates or reverse geolocation lookup or both |
| 4 | Start Time | Start time and date of travel | HH:MM/MM:DD:YY |
| 5 | End Time | End time and date of travel | HH:MM/MM:DD:YY |
| 6 | Notes | Map of Route from starting point to ending point | Textual, turn by turn description; Graphical Map derived from Mapquest, Google maps, Bing or Yahoo Maps. |

Continuing with the example of using method 300 as a rich travel log, block 305 thus comprises activating the location sensor 68 as discussed above, and block 310 comprises recording location data as discussed above. Block 315 can be implemented according to the blocks shown in FIG. 4, and thus block 316 comprises determining an external application for use as a rich travel log. The result of block 316 can be the determination that calendar application 132 can be used for the actual logging. Block 317 comprises determining data types for the external application. The result of performing block 317 can be all or part of the contents of Table I, or a variation thereon.

Block 318 comprises determining the actual contextual data that corresponds to the data types determined at block 317. Table II shows an example of contents that can be determined at block 318.

TABLE II

Travel Log for External Calendar Application
Example Travel Log Populated at block 318

| Field | External Application Field | Field Usage | Example Contents determined at block 318 |
|---|---|---|---|
| 1 | Colour Coding | Non-textual descriptor for travel activity type | Green |
| 2 | Subject | Textual descriptor for travel activity type | Motor vehicle Trip |

TABLE II-continued

Travel Log for External Calendar Application
Example Travel Log Populated at block 318

Figure 6:
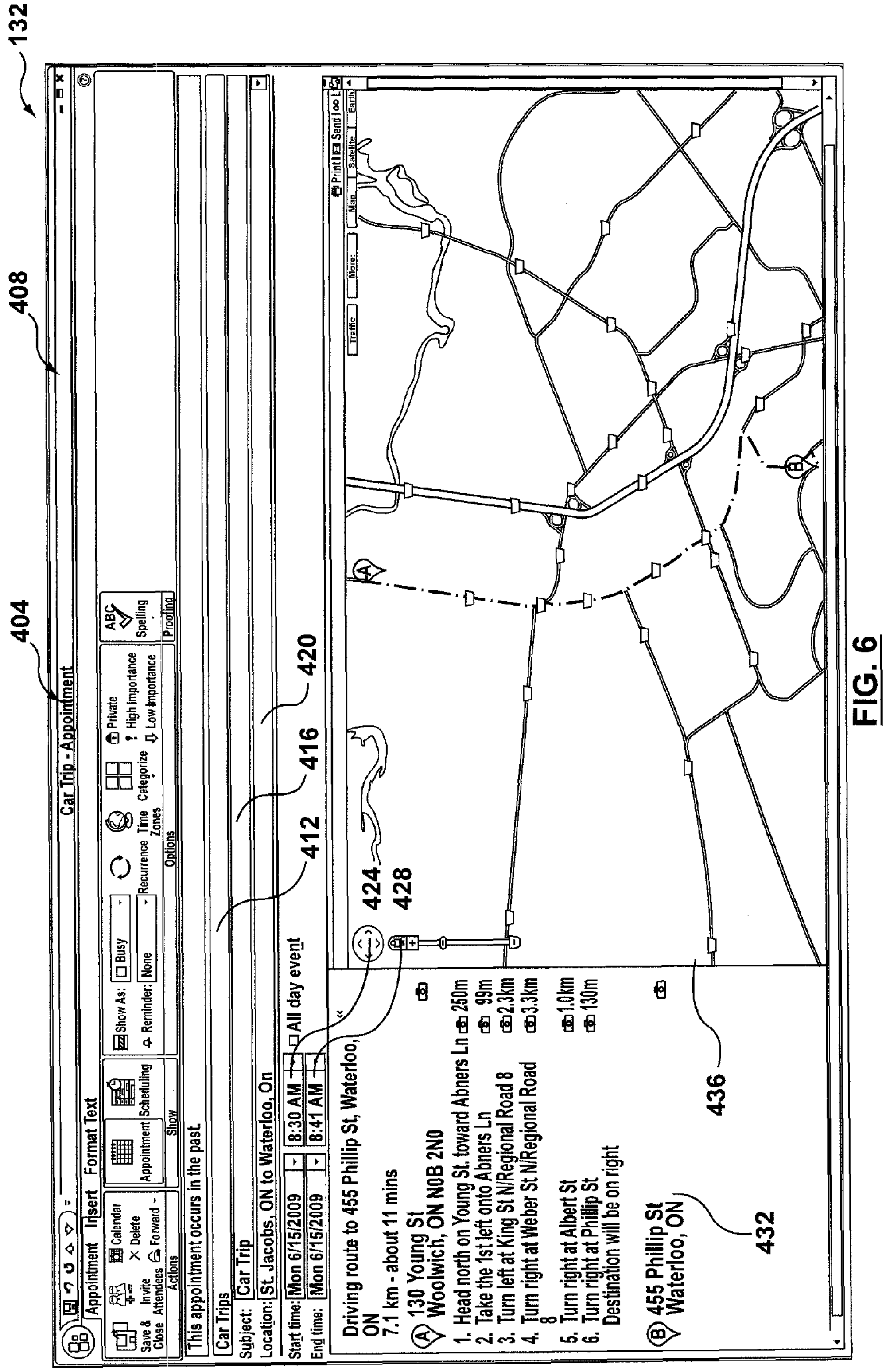
FIG. 6 shows another example view from a calendar application generated as a result of performing the method of FIG. 3.

| Field | External Application Field | Field Usage | Example Contents determined at block 318 |
|---|---|---|---|
| 3 | Location | One or both of starting point and ending point for travel | Woolwich Ontario to Waterloo Ontario |
| 4 | Start Time | Start time and date of travel | 08:30/06:15:2009 |
| 5 | End Time | End time and date of travel | 08:41/06:15:2009 |
| 6 | Notes | Map of Route from starting point to ending point | See field 432 and field 436 of FIG. 6 |

Figure 5A:
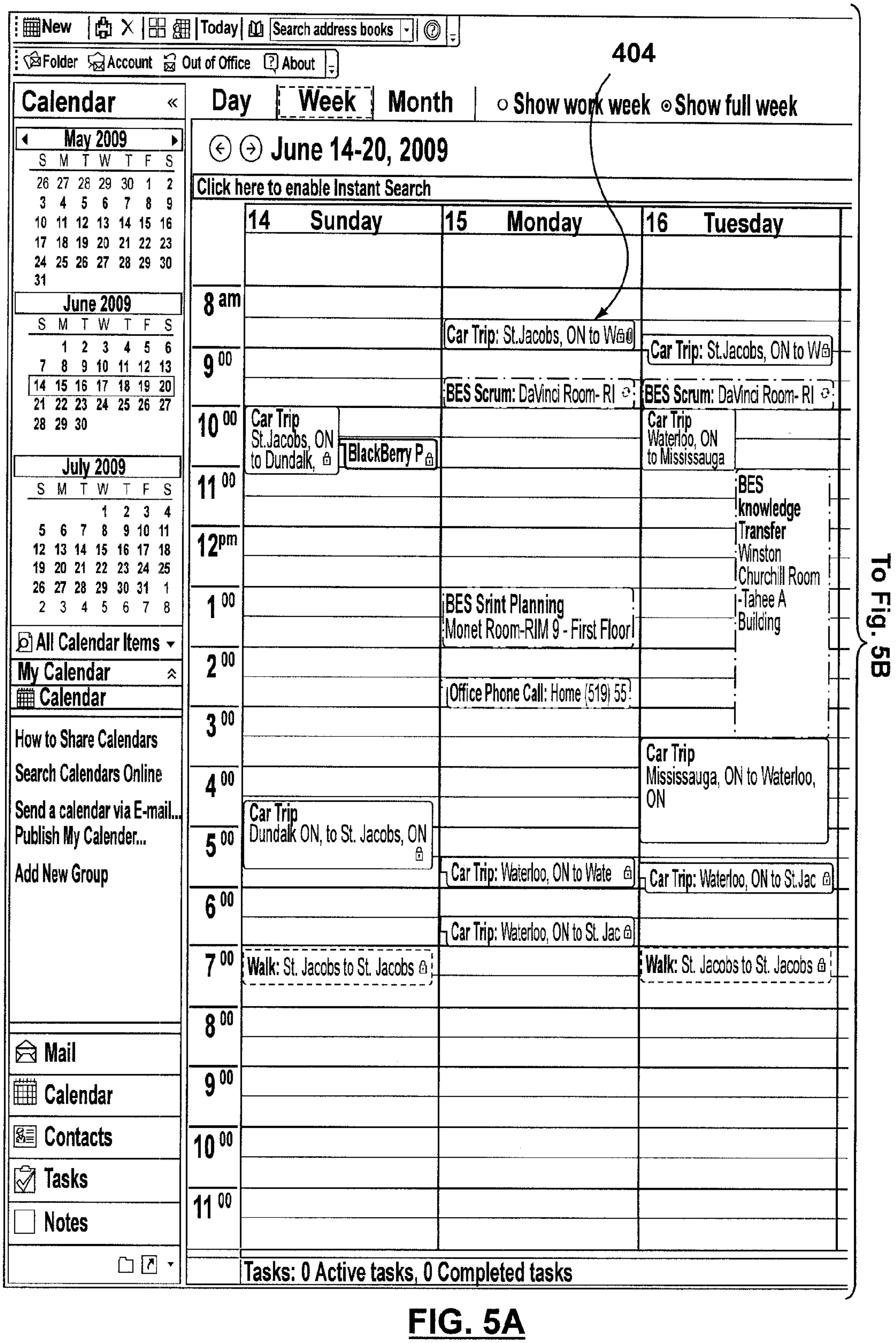
FIGS. 5A and 5B show an example view from a calendar application generated as a result of performing the method of FIG. 3.
Figure 5B:
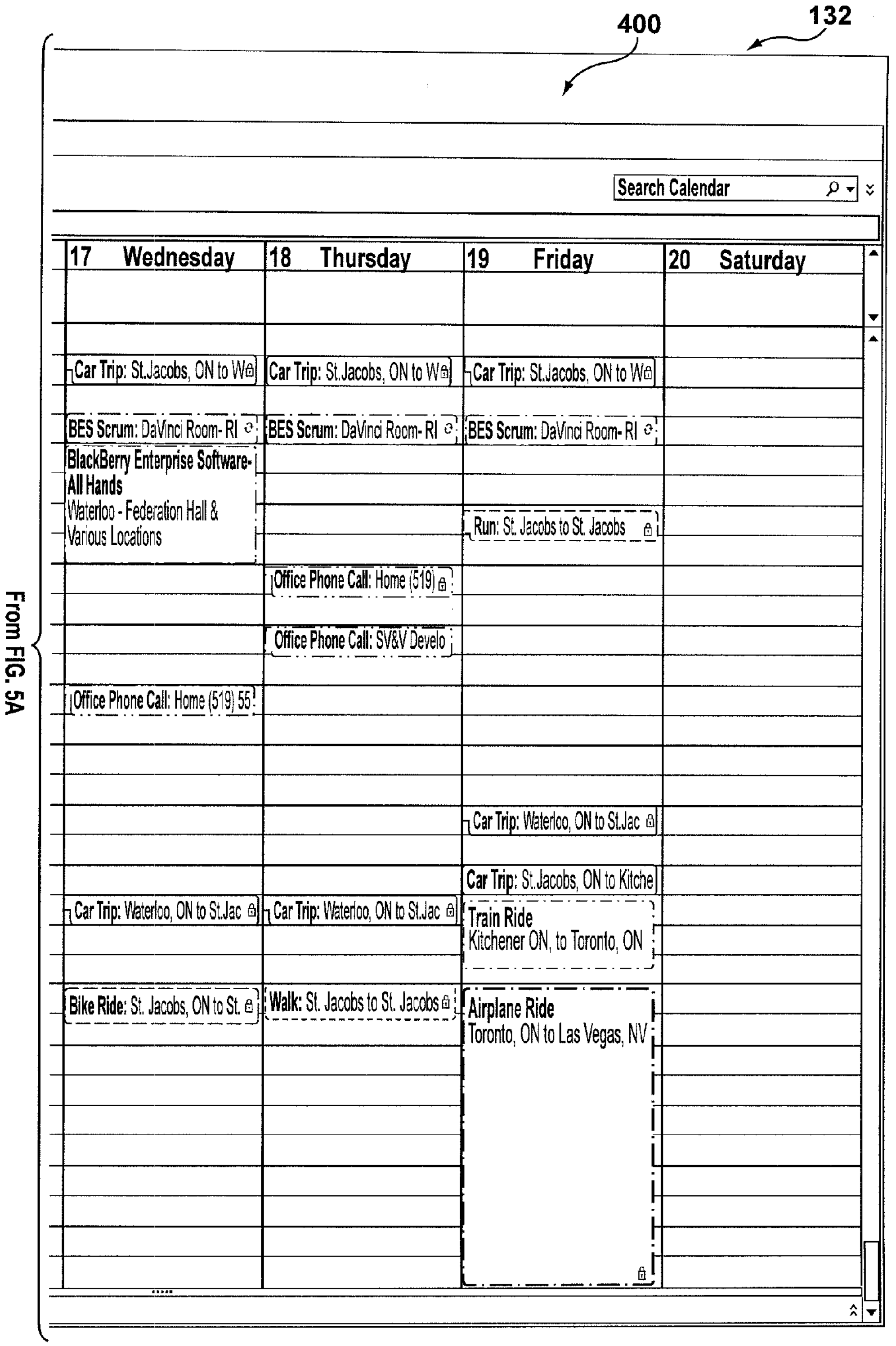

Returning again to FIG. 3, block 320 contemplates the exporting of the data shown in Table II to calendar application 132. FIG. 5 and FIG. 6 shows the results of the exporting according to the specific example in Table II. More specifically, FIG. 5 shows an example week view 400 from calendar application 132. Week view 400 includes an entry 404 on Monday Jun. 15, 2009 that reflects a portion of the contents of Table II. FIG. 6 shows an example day view 408 of entry 404, which includes all of the contents of Table II. More specifically, field 412 of day view 408 corresponds to the example contents of Field 1 from Table II; field 416 of day view 408 corresponds to the example contents of Field 2 from Table II; field 420 of day view 408 corresponds to the example contents of Field 3 from Table II; field 424 of day view 408 corresponds to the example contents of Field 4 from Table II; field 428 of day view 408 corresponds to the example contents of Field 5 from Table II; field 432 of day view 408 corresponds to the textual portion of Field 6 from Table II; field 436 of day view 408 corresponds to the graphical portion of Field 6 from Table II.

Having studied Table II, FIG. 5 and FIG. 6, it will now be appreciated that the contents thereof were recorded using method 300 based on an automobile trip that commenced at 8:30 AM on Monday Jun. 15, 2009 at 139 Young Street in St. Jacob's Ontario, and ended at 8:41 AM on Monday Jun. 15, 2009 at 455 Phillip Street Waterloo Ontario. The specific route shown in field 436 of FIG. 6 was recorded by periodic location sampling at block 310, and the actual map itself was associated with the sampled locations at block 315, accessing a third party mapping service to associate specific recorded coordinates with more traditional addressing information as shown in field 432 of FIG. 6 and field 436 of FIG. 6.

Figure 7:
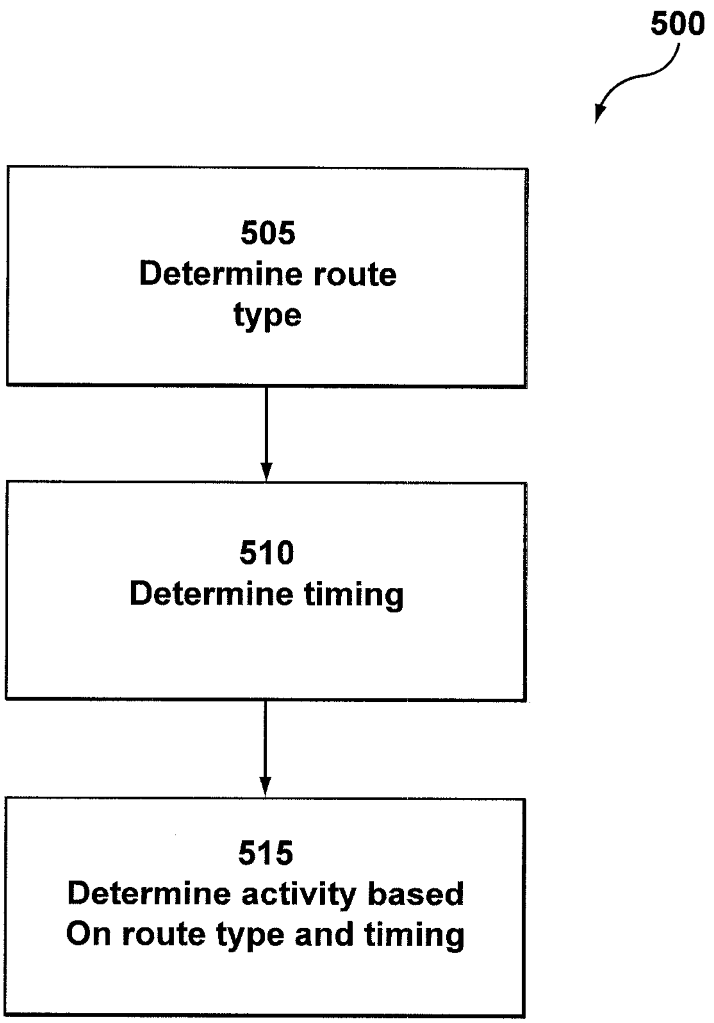
FIG. 7 shows a flowchart depicting a method of determining an activity type that can be used as part of the method of FIG. 3.

The means by which the activity type from Field 1 and Field 2 of Table II is determined is not particularly limited. Referring now to FIG. 7, however, a non-limiting example of a method for determining an activity type is indicated generally at 500. Method 500 can be used as part of, for example, block 318 of method 300. Block 505 comprises determining a route type. The route type can be determined by comparing the stored locations from block 315 with electronic maps of the type that are maintained by NavTEQ™ or Google™ or the like. Indeed, referring again to field 436 of FIG. 6, it can be seen that the recorded route corresponded with Highway Number 8, which can be identified as a motorway that would normally be used by motorized vehicles or possibly bicycles. Block 510 comprises determining the overall timing that was taken to complete the route. Referring to field 424 and field 428 and field 432 of FIG. 6, it can be determined that the overall time, as logged, was about eleven minutes to travel 7.1 kilometers. A speed can therefore be determined which can be used to determine that the speed averaged about 38.7 kilometers per hour which is more consistent with the travel time of a motorized vehicle and not a bicycle. (However, method 500 can be modified to provide a query such as "Please indicate the mode of transportation for this trip" in order to provide a means to resolve any ambiguity as to the mode of transport). Block 515 thus comprises making a final determination of the travel activity type, which can then be used to populate field 1 and field 2 of Table II.

Method 500 can also be used to infer walking as the travel activity type, where the speed of travel is consistent with walking and where the route that was traveled is associated with walking or hiking or running. Method 500 can thus be used to infer running as the travel activity type, where the speed of travel is consistent with running and where the route that was traveled is associated with walking or hiking or running. Method 500 can thus be used to infer bicycling as the travel activity type, where the speed of travel is consistent with bicycling and where the route that was traveled is associated with walking or hiking or running or bicycling. Method 500 can thus be used to infer a motor vehicle as the travel activity type, where the speed of travel is consistent with a motor vehicle and where the route that was traveled is associated with motor vehicles.

Method 500 can also be used to infer a train as the travel activity type, where the speed of travel is consistent with a train and where the route that was traveled is associated with train track. Further validation for inferring a train can be based on published rail schedules, which can be automatically accessed by device 50.

Method 500 can also be used to infer an airplane as the travel activity type, where the speed of travel is consistent with an airplane and where the route that was traveled is associated with an airplane. Of note is that in the air travel example it would be expected that device 50 may be shut off after take-off and turned on again after landing at the destination airport, and thus there may be a lack of intermediate travel points. Further validation for inferring an airplane trip can be based on published airline schedules, which can be automatically accessed by device 50.

Method 500 can also be varied to infer that the activity was not a travel activity but, for example, a telephone call or some other application that is local to device 50. For example, where device 50 is equipped with a telephone function, then method 300 can be used to log telephone calls in calendar application 132 when each call is completed. This can also be extended to logging usage of other applications on device 50, such as texting applications, word processors, or video games or others.

In another example, device 50 and method 300 can be used in conjunction with other applications 136. FIG. 8 shows an example of one other application 136, specifically identified as a spreadsheet application 136*a*. Spreadsheet application 136*a* comprises a travel log for the week of Jun. 14, 2009 in tabular format, which summarizes all logged events for that identified week. The left column defines various events that correspond generally to the examples provided in Table I. The bottom rows provide sub-totals for groupings of activities in the left column. A total number of minutes for a particular activity or event for a given day is provided in each cell. The far right column provides a weekly total. Of particular note is the very bottom row which contemplates a determination of carbon dioxide emissions associated with each of those activities, which provides but one example of how the features of this specification can be extended to novel data logging. Those skilled in the art will appreciate that the other time periods and formats for the spreadsheet are not particularly limited.

Other applications 136 will now occur to those skilled in the art, such as accounting packages, time tracking packages and the like.

Figure 9:
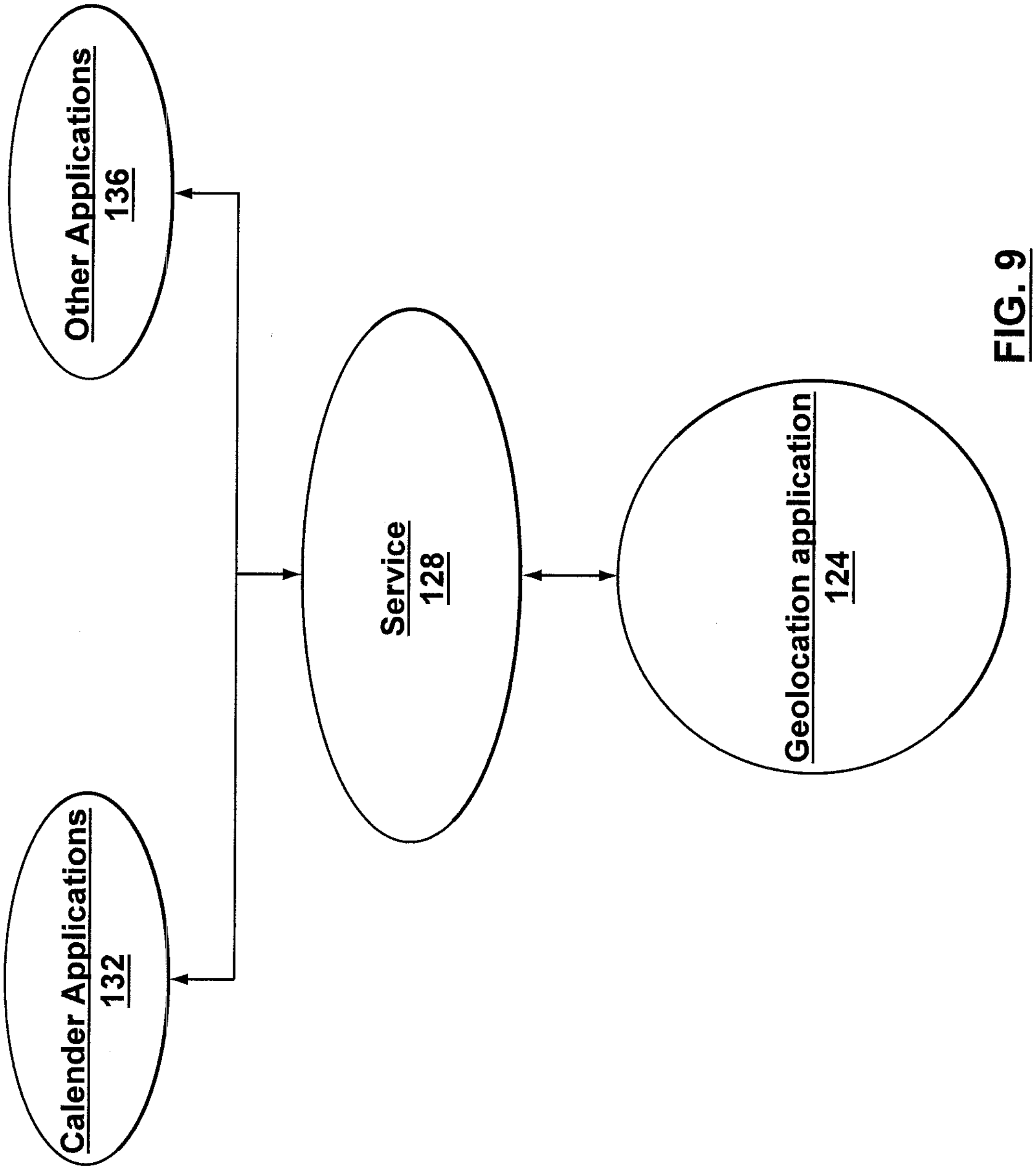
FIG. 9 shows a schematic representation of the relationships between various software objects shown in the block diagram of FIG. 2.

Referring now to FIG. 9, a schematic representation of how geolocation application 124 can interact with service 128, which in turn can interact with calendar application 132 or other applications 136. It is to be noted that service 128 can be omitted, or its functions incorporated directly into geolocation application 124, or incorporated directly into calendar application 132 or other applications 136. However, it is presently contemplated that service 128 is provided to intermediate between geolocation application 124 and applications such as calendar application 132 and other applications 136. More specifically, service 128 can be configured to access native programming interfaces within calendar application 132 and other applications 136, as well as to access native programming interfaces within geolocation application 124. In this manner, geolocation application 124 can be deployed independently from deployment of calendar application 132 or other applications 136, and vice versa.

Figure 10:
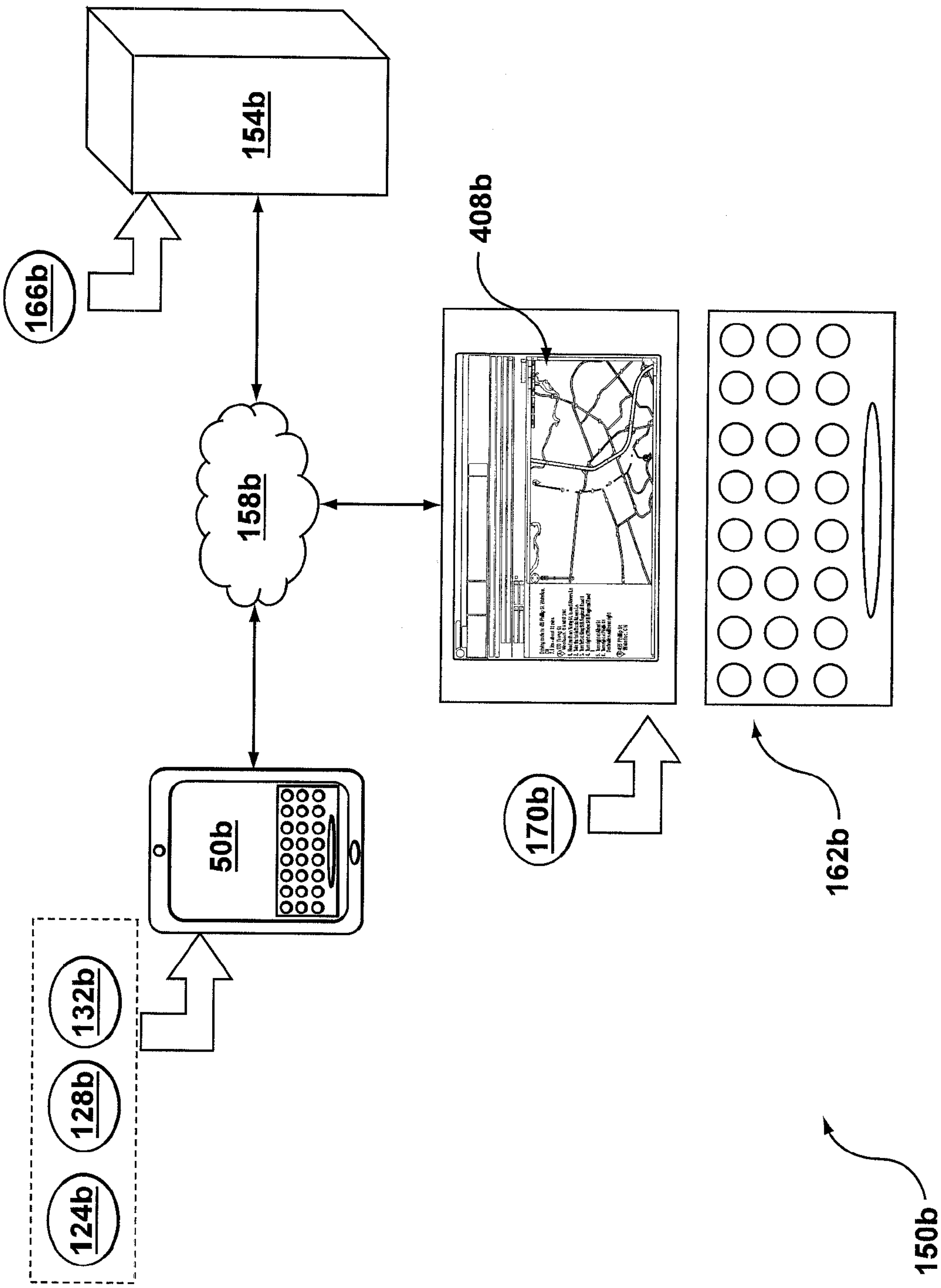
FIG. 10 shows a schematic representation of a system for enhanced geolocation incorporating a variation on the device of FIG. 2.

While the foregoing provides certain non-limiting example embodiments, it should be understood that combinations, subsets, and variations of the foregoing are contemplated. For example, FIG. 10 shows an enhanced geolocation system indicated generally at **150*b*. System 150*b* comprises a device 50*b*, which is a variation on device 50. Thus, like elements associated with device 50*b* bear like references to the device 50 counterpart, except followed by the suffix "b". System 50*b* also comprises a calendar server 154*b* that connects to device 50*b* via a network 158*b*. A client machine 162*b* (which is optional) also connects to network 158*b***.

The nature of network **158*b* is not particularly limited, and can be comprised of a private network or a public network or combinations thereof. Furthermore, network 158*b* can be comprised of one or more network topologies, including the Internet or other packet switched network, or any one or more of the network topologies discussed above in relation to network interface 112**.

Server **154*b* maintains a calendaring server application 166*b* which works in conjunction with calendar application 128*b* to maintain a copy of all calendar records associated with device 50*b*. Client machine 162*b* maintains its own calendar application 170*b* which can access all calendar records on either device 50*b* and server 154*b***.

The invention claimed is:

1. An electronic geolocation device comprising:

a location sensor configured to determine a series of current location coordinates of said electronic device;

a memory storing a calendar application and a geolocation application;

a processor connected to said location sensor and said memory;

said processor configured to execute said geolocation application to receive said current location coordinates from said location sensor and to associate a series of current times with said current location coordinates;

said processor further configured to automatically select an activity descriptor and retrieve address information based on said series of current location coordinates;

said processor further configured to execute the calendar application to automatically create a calendar event, said calendar event having a subject field containing said activity descriptor, a location field containing said address information, a start time field containing an initial one of said series of current times, and an end time field containing a final one of said series of current times; and said processor configured to store said calendar event in said memory in association with said calendar application.

2. The electronic device of claim 1 wherein said activity descriptor comprises a travel activity type, said processor configured to select said travel activity type based on a speed of travel of said electronic device determined from said series of current location coordinates.

3. The electronic device of claim 2 wherein said calendar event further comprises a color coding field containing a color corresponding to said travel activity type.

4. The electronic device of claim 2, said processor further configured to receive a route map represented as at least one of text or graphics, wherein said calendar event includes a notes field containing said route map.

5. The electronic device of claim 1, said processor further configured to select said activity descriptor based on activity of another application on said electronic device.

6. The electronic device of claim 4, said processor configured to receive said route map from an external mapping service.

7. A geolocation method for an electronic device comprising:

storing a calendar application and a geolocation application in a memory connected to a processor of the electronic device;

executing said geolocation application on said processor to receive a series of current location coordinates from a location sensor connected to said processor, and to associate a series of current times with said current location coordinates;

at said processor, automatically selecting on activity descriptor and retrieving address information based on said series of current location coordinates;

at said processor, executing the calendar application to automatically create a calendar event, said calendar event having a subject field containing said activity descriptor, a location field containing said address information, a start time field containing on initial one of said series of current times, and an end time field containing a final one of said series of current times; and, storing said calendar event in said memory in association with said calendar application.

8. The method of claim 7 wherein said activity descriptor comprises a travel activity type said selecting being based on a speed of travel of said electronic device determined from said series of current location coordinates.

9. The method of claim 8 wherein said calendar event further comprises a color coding field containing a color corresponding to said travel activity type.

10. The method of claim 8, further comprising receiving a route map represented as at least one of text or graphics, wherein said calendar event includes a notes field containing said route map.

11. The method of claim 7, said selecting being based on activity of another application on said electronic device.

12. A non-transitory computer readable medium configured to store a plurality of programming instructions executable on a processor of an electronic device storing a calendar application and a geolocation application; said programming instructions comprising a method comprising:

executing said geolocation application on said processor to receive a series of current location coordinates from a location sensor connected to said processor, and to associate a series of current times with said current location coordinates;

at said processor, automatically selecting an activity descriptor and retrieving address information based on said series of current location coordinates;

at said processor, executing the calendar application to automatically create a calendar event, said calendar event having a subject field containing said activity descriptor, a location field containing said address information, a start time field containing an initial one of said series of current times, and an end time field containing a final one of said series of current times; and, storing said calendar event at said electronic device in association with said calendar application.

* * * * *